June 11, 1935.　　　D. T. MAIN　　　2,004,413
WEATHER STRIP
Filed March 1, 1933
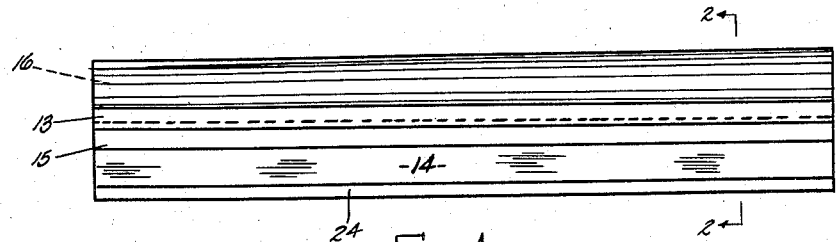
Fig. 1
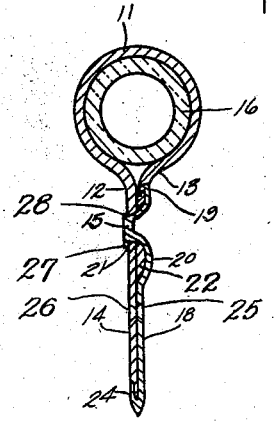
Fig. 2
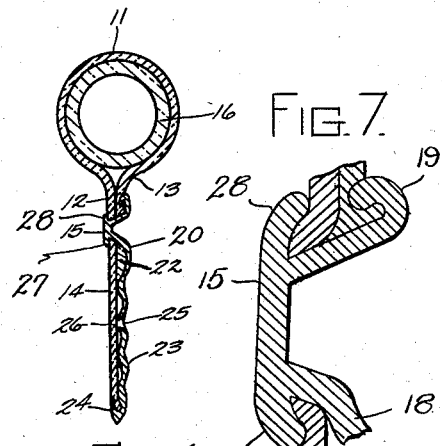
Fig. 7
Fig. 6
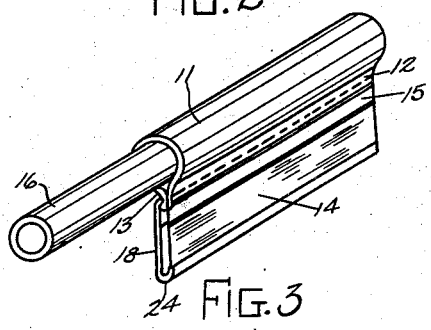
Fig. 3
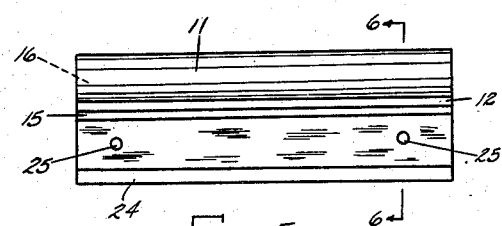
Fig. 5
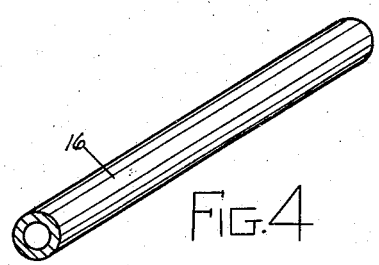
Fig. 4
INVENTOR
D. T. Main
By E. J. Fetherstonhaugh
ATTORNEY Patented June 11, 1935

2,004,413

UNITED STATES PATENT OFFICE 2,004,413

WEATHER STRIP

Daniel Todd Main, Westmount, Quebec, Canada, assignor to Best Weather Strip Company Limited, Hamilton, Ontario, Canada Application March 1, 1933, Serial No. 659,028

3 Claims. (Cl. 20—69)

The invention relates to a weather strip, as described in the present specification and illustrated in the accompanying drawing which forms a part of the same.

The invention consists essentially in encasing a compressible rubber tube in a rubber barrel having an extending flap for nailing partially covered by an overlap at the other side of the strip as pointed out in the claims for novelty following a description in detail of preferred forms of the invention.

The objects of the invention are to maintain railway passenger cars and other enclosures free from drafts and dust, that are likely to permeate through the closed sashes in the frames and pervade the interior, and also avoid the percolation of water during great storms and to do this in a very simple manner by applying cushion seals permanently attached to storm windows and to sashes; to reduce the expense of attaching weather strips and the cost of the strip as well as furnishing a strip that may remain on for all time and not necessarily be removed at change of seasons; and generally to provide an efficient and economical weather strip.

In the drawing, Figure 1 is a plan view of the weather strip.

Figure 2 is an enlarged cross sectional view of the weather strip taken on lines 2—2 in Figure 1.

Figure 3 is a perspective view of the rubber length forming the case and nailing flap.

Figure 4 is a detail of the cushion stuffing.

Figure 5 is a plan view of a reinforced nailing flap extending from the cushion.

Figure 6 is a cross sectional view of the form of the invention illustrated.

Figure 7 is an enlarged cross sectional detail showing the method of securing the tubing to the nailing strip.

Like numerals of reference indicate corresponding parts in the various figures.

Referring to the drawing, the weather strip 10 is preferably formed of pliable rubber sheet material or material having somewhat similar characteristics and is formed of the outer packing case 11 which envelopes the inner flexible tube 16 and which is secured to the reinforcing member 18 and the packing strip 14.

The packing case 11 contains a pliable soft rubber tube 16 of comparatively less pliability and greater thickness than the packing case 11.

The strip is nailed or otherwise secured to the sash or to the frame according to the particular application of the invention and the cushion seal pressed against the adjacent surface usually the window frame and if the strip is all rubber it may be fastened in place without being cut until the installation for that window is complete.

The packing strip portion 14 is retained in position to the metal reinforcing member 18 by turning the tail 24 upwardly and inwardly over the outer end of the strip portion 14, and by swaging the flange 27 of the body portion 15 of the reinforcing member 18 inwardly at the inner end of the packing strip 14.

The casing 11 is secured to the metal reinforcing member 18 in a similar manner, the tail piece 19 being curled inwardly securing the edge 13 while the flange 28 of the body portion 15 is swaged inwardly securing the edge 12 of the casing 11 to the reinforcing member 18.

The strap 18 is punched at intervals and the splayed ends of the punchings 25 securely grip the rubber or other material and these punched holes also form the openings for entry of the fastening nails or screws.

The space between the packing strip 14 and the offset 20 of the reinforcing member 18 is packed with soft yielding packing material 22, such as soft rubber, and is for the purpose of filling in the uneven surfaces of the woodwork or frame to which it is applied, and which, upon pressure will compress where required thus forming a more regular closely fitting joint.

In the reinforced form as shown in Figure 6 of the drawing, the weather strip 10 must or should be cut into the desired lengths before applying to the door or window and is somewhat more efficient, although lacking the flexibility of the former form.

The principal throughout is entirely the same with the exception of the tail of the reinforcing member 18 which has the corrugated surface 23 and which is more adaptable to rougher surfaces and where a more rugged type of construction is required or preferred.

What I claim is:—

1. A weather strip comprising an outer casing of pliable sheet material encasing a flexible inner tube of slightly greater thickness and compressibility than the said outer casing, said outer casing having extended edges forming flanges of unequal length adapted to be securely held in the jaw portion of an irregular shaped metallic reinforcing member, said reinforcing member having a tail piece projecting therefrom having secured thereto a flat flexible rubber packing strip, holes punched in said tail piece at close intervals along its length, said holes adapted to receive the fastening means.

2. A weather strip comprising an outer casing of pliable sheet material encasing a flexible inner tube of slightly greater thickness and compressibility than the said outer casing, said outer casing having extended edges forming flanges of unequal length adapted to be securely held in the jaw portion of an irregular shaped metallic reinforcing member, said reinforcing member having a tail piece projecting therefrom having a pocket cavity at its base adapted to retain soft flexible packing, and said tail piece having secured thereto a flat flexible rubber packing strip, holes punched in said tail piece at close intervals along its length, said holes adapted to receive the fastening means.

3. A weather strip comprising an outer casing of pliable sheet material encasing a flexible inner tube of slightly greater thickness and compressibility than the said outer casing, said outer casing having extended edges forming flanges of unequal length adapted to be securely held in the jaw portion of an irregular shaped metallic reinforcing member, said reinforcing member having a corrugated tail piece projecting therefrom having a pocket cavity at its base adapted to retain soft flexible packing, and said tail piece having secured thereto a flat flexible rubber packing strip, holes punched at close intervals along its length said holes adapted to receive the fastening means.

DANIEL TODD MAIN.